United States Patent [19]
Asai et al.

[11] Patent Number: 5,402,430
[45] Date of Patent: Mar. 28, 1995

[54] PARITY INVERSION TEST SYSTEM

[75] Inventors: Masao Asai; Yuji Shibata; Makoto Okazaki, all of Kawasaki, Japan

[73] Assignee: Fujitsu Limited, Kanagawa, Japan

[21] Appl. No.: 955,826

[22] Filed: Oct. 2, 1992

[30] Foreign Application Priority Data

Oct. 4, 1991 [JP] Japan .................................. 3-257382

[51] Int. Cl.[6] ........................................... G01R 31/00
[52] U.S. Cl. .................. 371/49.1; 371/20.4; 371/23
[58] Field of Search ............... 371/3, 2.1, 20.1, 20.4, 371/23, 49.1, 49.2

[56] References Cited
U.S. PATENT DOCUMENTS

4,914,655  4/1990  Johannes et al. ................. 371/49.1

Primary Examiner—Vincent P. Canney

[57] ABSTRACT

A parity inversion test system includes an interface part having an input side coupled to a N-bit data line and an output side coupled to a M-bit data line, where $N<M$, an output coupling part for coupling at least a part of a data output from the output side of the interface part to the data output from the output side of the interface part in a test mode so as to output a M-bit data, a parity generating part for generating a parity data with respect to the M-bit data output to the M-bit data line via the output coupling part based on the M-bit data, and a parity inversion bit specifying part for specifying arbitrary bits of the M-bit data output to the M-bit data line which are to be inverted when generating the parity data in the parity generating part.

12 Claims, 10 Drawing Sheets

PARITY INVERSION TEST SYSTEM

BACKGROUND OF THE INVENTION

The present invention generally relates to parity inversion test systems, and more particularly to a parity inversion test system which is used in a bus interface circuit and the like and is especially suited for a case where input/output data lines having different data widths are connected to the interface circuit.

The parity inversion test is used to test whether or not the parity check function is operating normally. In a data bus, communication channel and the like, the parity inversion test is carried out by generating a parity data by inverting arbitrary bits of an input data and making a check to determine whether or not an error is detected on the receiving end.

It is desirable to carry out the parity inversion test also when the interface circuit is connected to buses having different bus widths for the input and output. In this case, it is also desirable that the parity inversion test be carried out correctly for all data widths using an input with a minimum data width, the test time be short, and the parity inversion test be simple.

Figure 1:
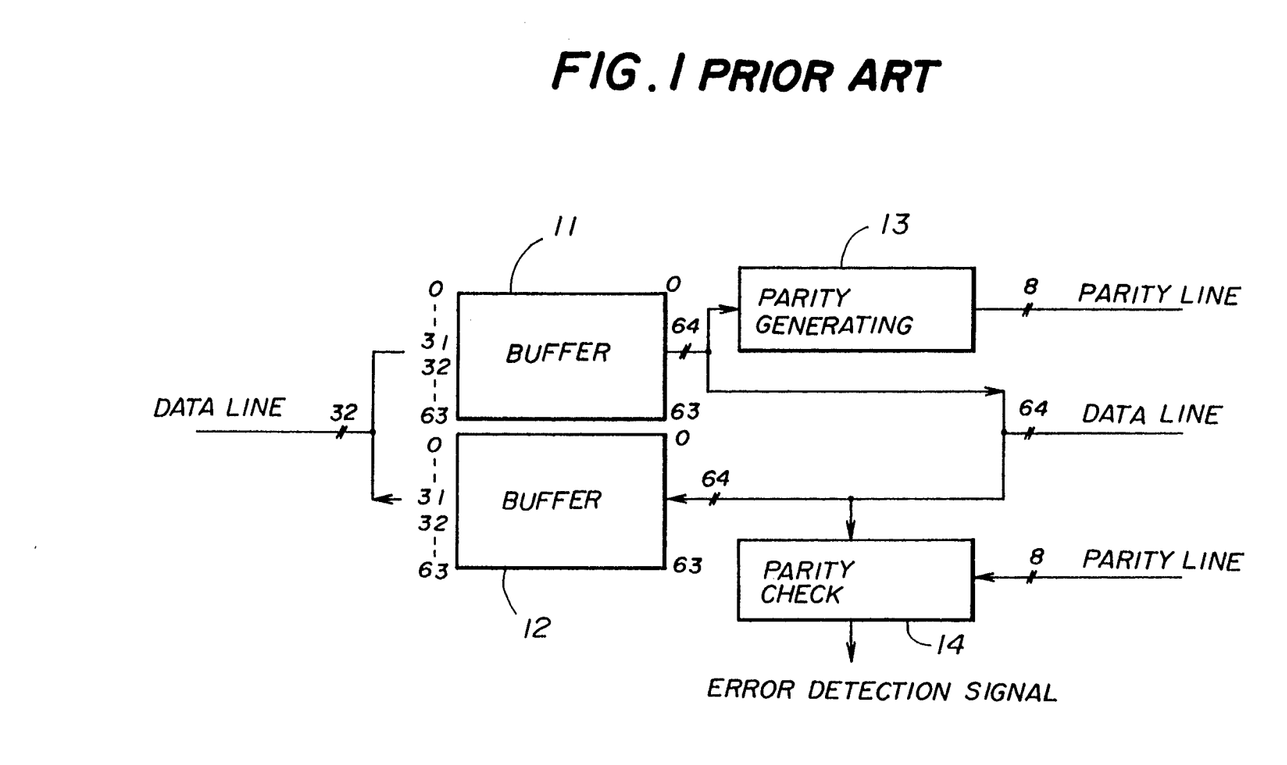
FIG. 1 is a system block diagram showing an example of an interface circuit having different input/output data widths.

FIG. 1 shows an example of an interface circuit having different input/output data widths. This interface circuit connects a data line having a data width of 32 bits and a data line having a data width of 64 bits. The interface circuit shown in FIG. 1 includes buffers 11 and 12 respectively made up of 64-bit first-in-first-out (FIFO) buffers, a parity generating circuit 13 and a parity check circuit 14 which are connected as shown.

In FIG. 1, the data from the 32-bit data line is alternately input to the FIFO buffer 11 as the upper bits 0 to 31 and the lower bits 32 to 63. The data are read out from the FIFO buffer 11 in parallel as a 64-bit data and output via the 64-bit data line.

In addition, the data from the 64-bit data line is input in parallel to the FIFO buffer 12. The data is alternately read out from the FIFO buffer 12 as the upper bits 0 to 31 and the lower bits 32 to 63 and output via the 32-bit data line.

The parity generating circuit 13 generates a parity data with respect to the 64-bit output data of the buffer 11 at a rate of 1 bit in 8 bits. The 8-bits parity data from the parity generating circuit 13 is output via a parity line.

At the receiving end which receives the data from the 64-bit data line via a data bus or a communication line, the parity check circuit 14 generates the parity data with respect to the received 64-bit data similarly to the transmitting end, and compares the parity data with the 8-bits parity data which is received from the transmitting end via the parity line. If the two compared parity data do not match, the parity check circuit 14 generates an error detection signal which indicates an error in the data bus or the communication line.

Figure 2:
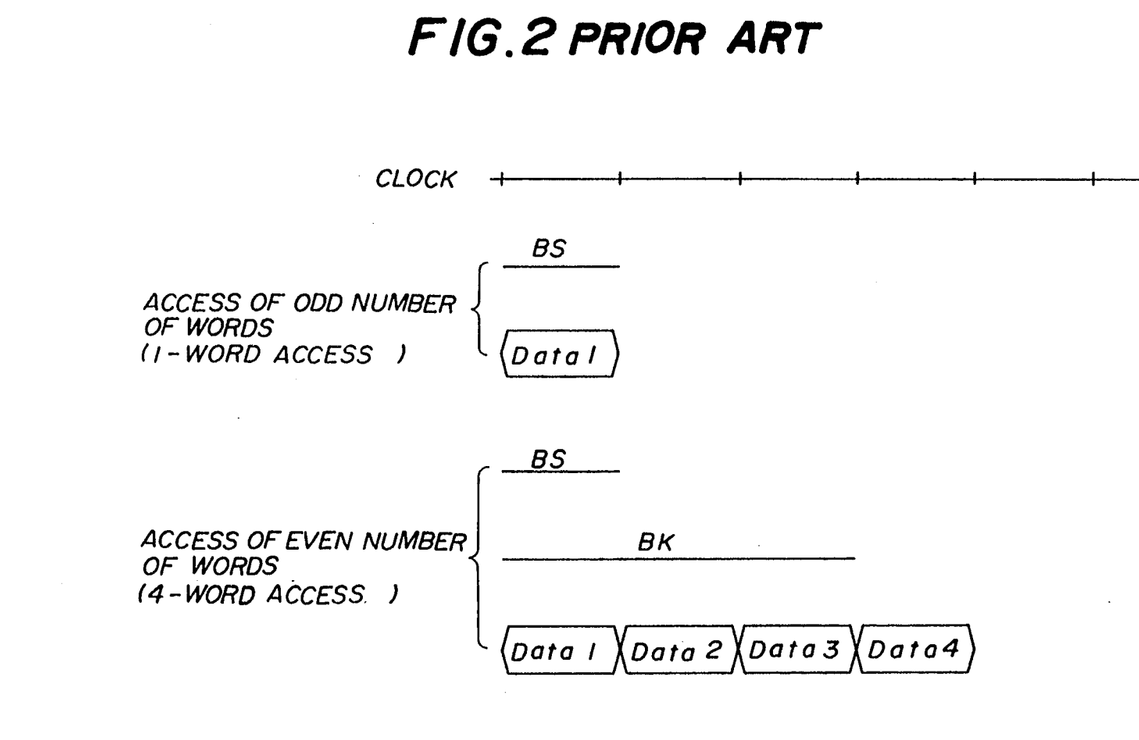
FIG. 2 shows a bus sequence at the input side of the interface circuit shown in FIG. 1.

FIG. 2 shows a bus sequence at the input side of the interface circuit shown in FIG. 1, that is, the bus sequence on the 32-bit side. FIG. 2 shows an access of an odd number of words and a 1-word access in particular, and an access of an even number of words and a 4word access in particular.

In the case of the access of an odd number of words, a data Data 1 amounting to 1 word is read in response to a clock signal when a bus start signal BS is generated. The bus start signal BS indicates the start of the access. On the other hand, in the case of the access of an even number of words, data Data 1 through Data 4 amounting to four words are read in response to each clock signal based on a block signal BK which indicates the size of the data block when the bus start signal BS is generated.

Figure 3:
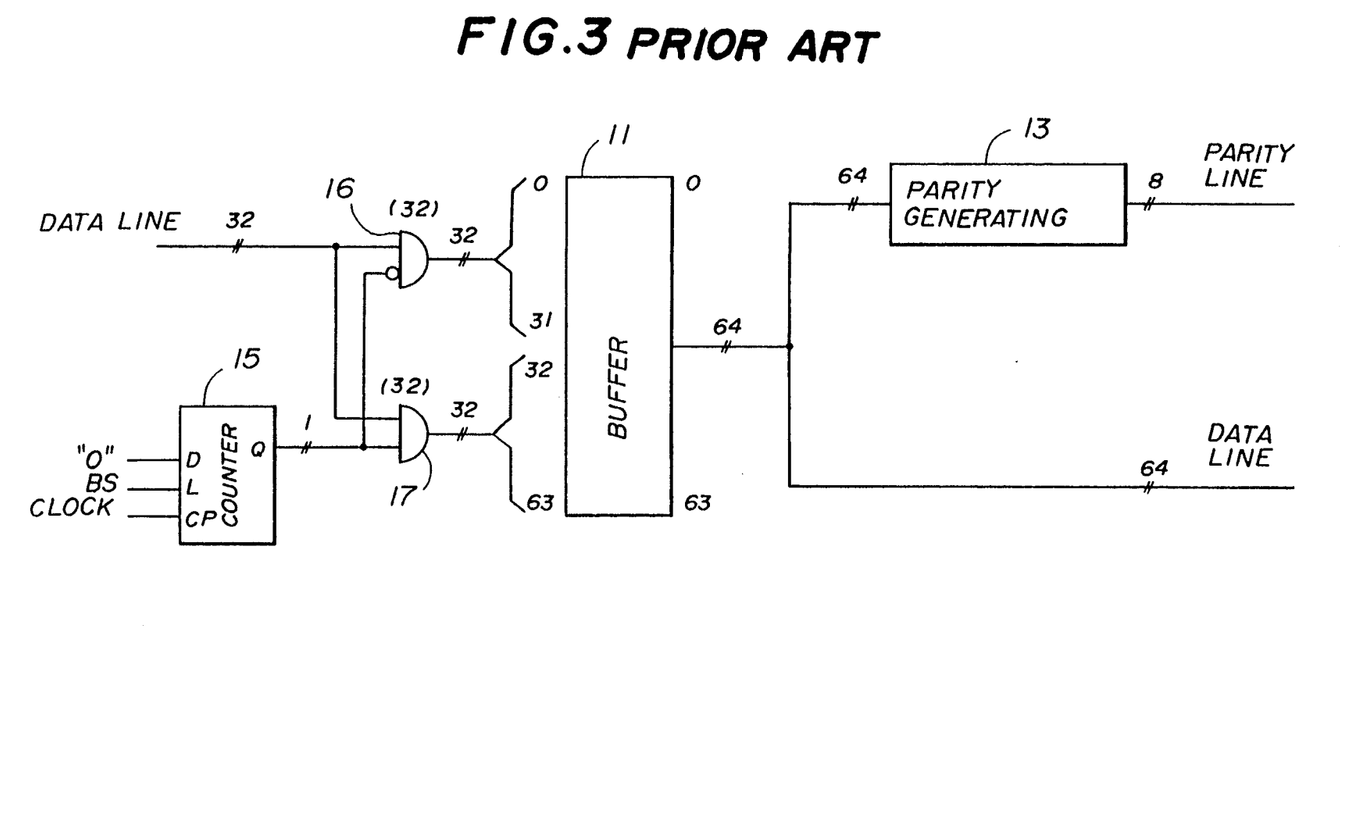
FIG. 3 is system block diagram showing an example of a conventional parity inversion test system.

FIG. 3 shows an example of a conventional parity inversion test system. In FIG. 3, those parts which are the same as those corresponding parts in FIG. 1 are designated by the same reference numerals, and a description thereof will be omitted. As shown in FIG. 3, a 2-bit counter 15 and AND gates 16 and 17 are provided.

A data "0" is applied to an input terminal D of the counter 15. The counter 15 starts to count from "0" in response to a clock signal which is applied to a clock input terminal CP when the bus start signal BS is applied to a load input terminal L, and generates at an output terminal Q a signal which is inverted for every clock signal.

First, the AND gate 16 opens in response to the output signal "0" of the counter 15, and 1 word of data from the 32-bit data line is read into the buffer 11 as the upper bits 0 to 31. Next, the AND gate 17 opens in response to the output signal "1" of the counter 15, and 1 word of data from the 32-bit data line is read into the buffer 11 as the lower bits 32 to 63. Similarly thereafter, the data from the 32-bit data line is alternately written into the buffer 11 as the upper bits and the lower bits. Hence, when the upper and lower bits are read out from the buffer 11 in parallel, it is possible to output a 64-bit data via the 64-bit data line.

The parity generating circuit 13 generates 1 bit of parity data for every 8 bits of the 64-bit output data of the buffer 11, and outputs the 8-bits parity data to the 8-bits parity line. With respect to the input data, the parity generating circuit 13 generates the parity data by inverting codes of the bits which are specified by an external signal, so that the parity inversion test can be carried out.

Figure 4:
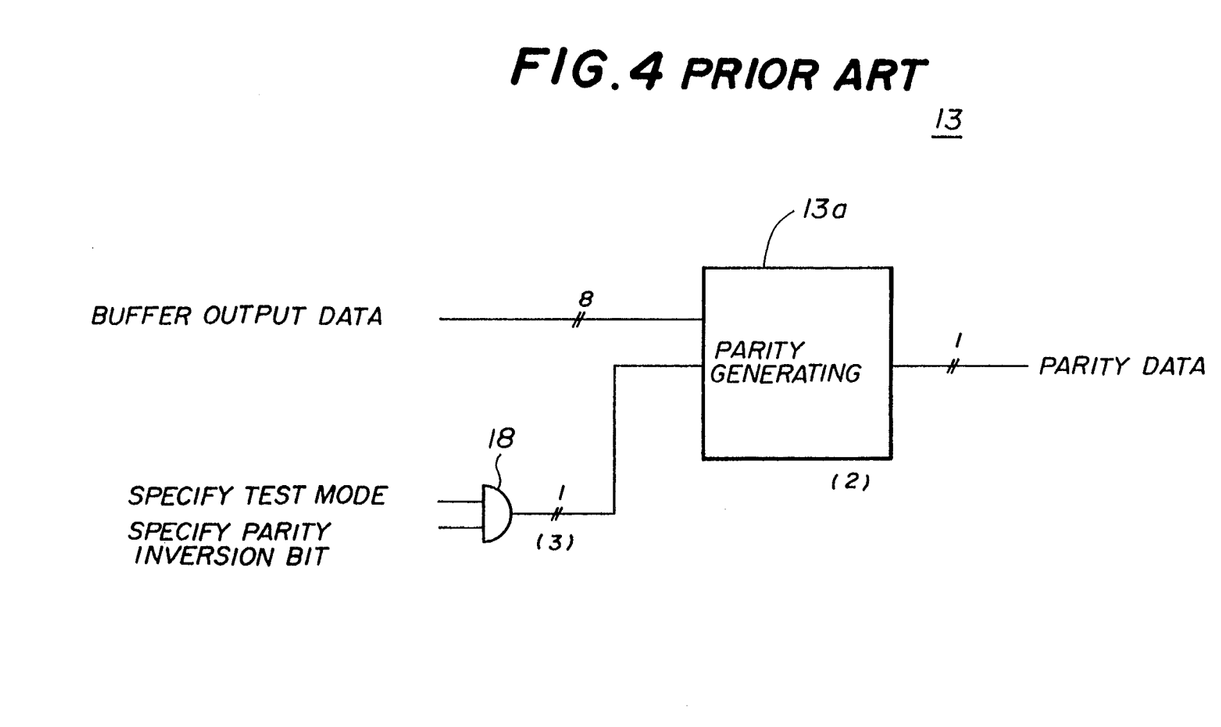
FIG. 4 is system block diagram showing a parity generating circuit of the system shown in FIG. 3.

FIG. 4 shows the parity generating circuit 13 shown in FIG. 1. The parity generating circuit 13 shown in FIG. 4 is made up of a parity generating part 13a and an AND gate 18.

In order to carry out the parity inversion test, the bits of the 8-bits input data the codes of which are to be inverted are specified by a parity inversion bit specifying signal. When carrying out the parity inversion test, a test mode specifying signal which specifies the test mode is input so as to generate a 1bit output from the AND gate 18. Hence, the parity generating part 13a generates the parity data with respect to the data which is obtained by inverting specified bits of the 8-bits output data of the buffer 11, and the parity data is output via the parity line.

Figure 5:
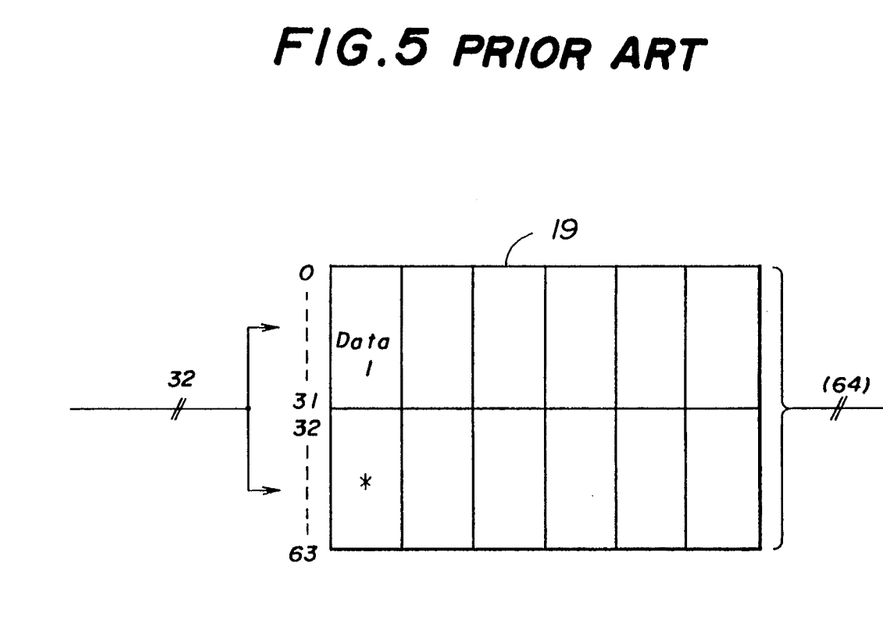
FIG. 5 is a diagram for explaining a state where one word is stored in a buffer according to the conventional system.

FIG. 5 shows a state where 1 word is stored according to the conventional system. A 64-bit buffer 19 shown in FIG. 5 may be used as the buffer 11 or 12. In the case shown in FIG. 5, 1 word of data Data 1 having 32 bits is read into the upper bits 0 to 31 of the buffer 19. No data corresponding to the lower bits 32 to 63 is read into the buffer 19, and thus, the data corresponding to the lower bits 32 to 63 is undetermined as indicated by "*".

Therefore, when conventionally carrying out the parity inversion test using the construction shown in FIG. 3 at the 64-bit side of the interface circuit which connects the 32-bit data line to the 64-bit data line, for example, the data is stored in the buffer 19 as shown in FIG. 5 if a 1-word access (odd number of words) is made as shown in FIG. 2. In this state, when the data is transmitted to the 64-bit data line, the data appears in the upper bits 0 to 31, but the value of the data output to the lower bits 32 to 63 becomes undetermined. If the 5 bits of the data output to the lower bits 32 to 63 are fixed to "0" or "1" the parity inversion test cannot be carried out in a satisfactory manner. For this reason, according to the conventional parity inversion test system, there is a problem in that a two-word data (even number of words) must be input to the upper bits and to the lower bits of the 64-bit buffer 19 from the 32-bit data line.

The above described problem is not limited to the interface circuit which connects the 32-bit data line with the 64-bit data line. In general, in an interface circuit which connects first and second data lines where the ratio of the data widths of the first and second data lines is N:nN, it is necessary to input a nN-bit data from the N-bit data line.

SUMMARY OF THE INVENTION

Accordingly, it is a general object of the present invention to provide a novel and useful parity inversion test system in which the problems described above are eliminated.

This object and other objects of the present invention are attained by a parity inversion test system comprising interface means having an input side coupled to a N-bit data line and an output side coupled to a M-bit data line, where N<M, output coupling means, coupled to the output side of the interface means, for coupling at least a part of a data output from the output side of the interface means to the data output from the output side of the interface means in a test mode so as to output a M-bit data, parity generating means, coupled to the M-bit data line, for generating a parity data with respect to the M-bit data output to the M-bit data line via the output coupling means based on the M-bit data, and parity inversion bit specifying means, coupled to the parity generating means, for specifying arbitrary bits of the M-bit data output to the M-bit data line which are to be inverted when generating the parity data in the parity generating means. According to the parity inversion test system of the present invention, it is possible to carry out the parity inversion test correctly with respect to the entire data width using an input which has a minimum data width. For this reason, it is possible to reduce the test time and simplify the parity inversion test.

In an embodiment, a parity inversion test system comprises interface means having an input side coupled to a N-bit data line and an output side coupled to a M-bit data line, where N<M, input coupling means, coupled to the N-bit data line and the input side of the interface means, for coupling at least a part of a data input to the input side of the interface means to the data input to the interface means in a test mode so as to input a M-bit data to the interface means, parity generating means, coupled to the M-bit data line, for generating a parity data with respect to the M-bit data output to the M-bit data line from the interface means based on the M-bit data output from the interface means, and parity inversion bit specifying means, coupled to the parity generating means, for specifying arbitrary bits of the M-bit data output to the M-bit data line which are to be inverted when generating the parity data in the parity generating means. According to the parity inversion test system of the present invention, it is possible to carry out the parity inversion test correctly with respect to the entire data width using an input which has a minimum data width. For this reason, it is possible to reduce the test time and simplify the parity inversion test.

Other objects and further features of the present invention will be apparent from the following detailed description when read in conjunction with the accompanying drawings.

DESCRIPTION OF THE PREFERRED EMBODIMENTS

Figure 6:
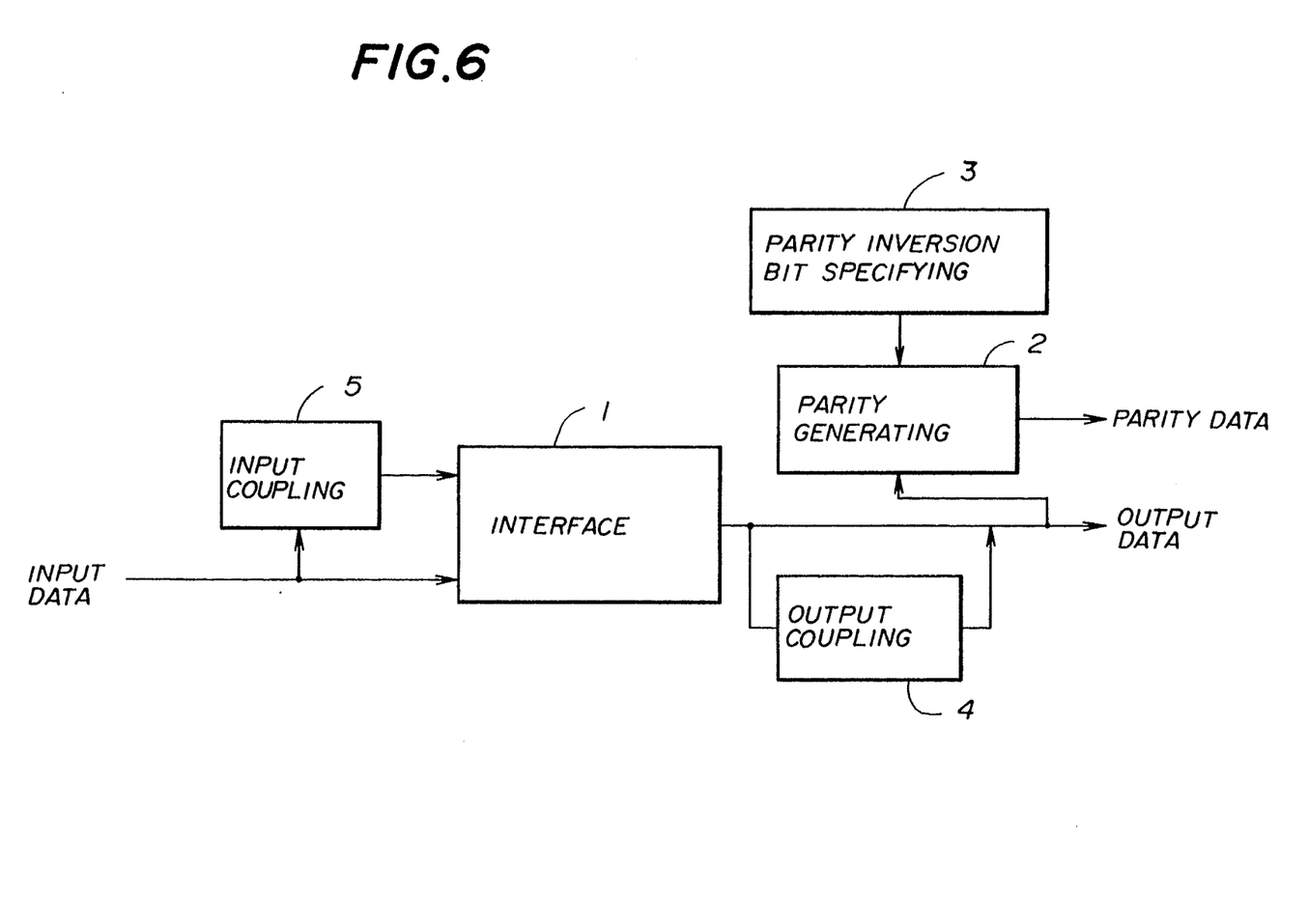
FIG. 6 is a system block diagram for explaining the operating principle of the present invention.

First, a description will be given of the operating principle of the present invention, by referring to FIG. 6.

In the present invention, a parity generating part 2 is provided at the output side of an interface part 1 which has an input side data width smaller than an output side data width, so as to add and transmit a parity data which is generated with respect to the output data of the interface part 1. A parity inversion bit specifying part 3 specifies arbitrary bits which are to be inverted in the parity generating part 2 when generating the parity data. An output coupling part 4 is provided at the output side of the interface part 1. The output coupling part 4 couples the output data of the interface part 1 with a part of or all the data width of the output data of the interface part 1, so as to obtain a data having the total data width of the interface part 1.

According to the present invention, an input coupling part 5 may be provided at the input side of the interface part 1. The input coupling part 5 couples the input data of the interface part 1 with a part of or all the data width of the input data to the interface part 1, so as to input a data having the total data width with respect to the interface part 1.

The parity inversion bit specifying part 3 may specify the arbitrary bits to be inverted with respect to the parity generating part 2 via an external terminal. Alternatively, the parity inversion bit specifying part 3 may be provided with an internal register, and the arbitrary bits to be inverted may be specified with respect to the parity generating part 2 by setting the value of the internal register.

As described above, the data width at the input side of the interface part 1 is smaller than that at the output side thereof. The parity generating part 2 is provided at the output side of the interface part 1. The parity generating part 2 generates the parity data with respect to the output data of the interface part 1 and outputs the parity data by adding the parity data to the output data of the interface part 1. The parity inversion bit specifying part 3 specifies the arbitrary bits to be inverted in the parity generating part 2, so as to enable a parity inversion test. The output coupling part 4 obtains the data having the total data width at the output side of the interface part 1. If the input coupling part 5 is provided, the input coupling part 5 obtains the data having the total data width at the input side of the interface part 1.

Accordingly, when transmitting the data received from the data line having a smaller data width to the data line having a greater data width via the interface part 1, it is possible to obtain as the output the data having the total data width, at the output side of the interface part 1 without having to input the data having the same data width as the data line having the greater data width. As a result, the data will not become undetermined at the data line having the greater data width, and it is possible to correctly carry out the parity inversion test for the total data width.

Figure 7:
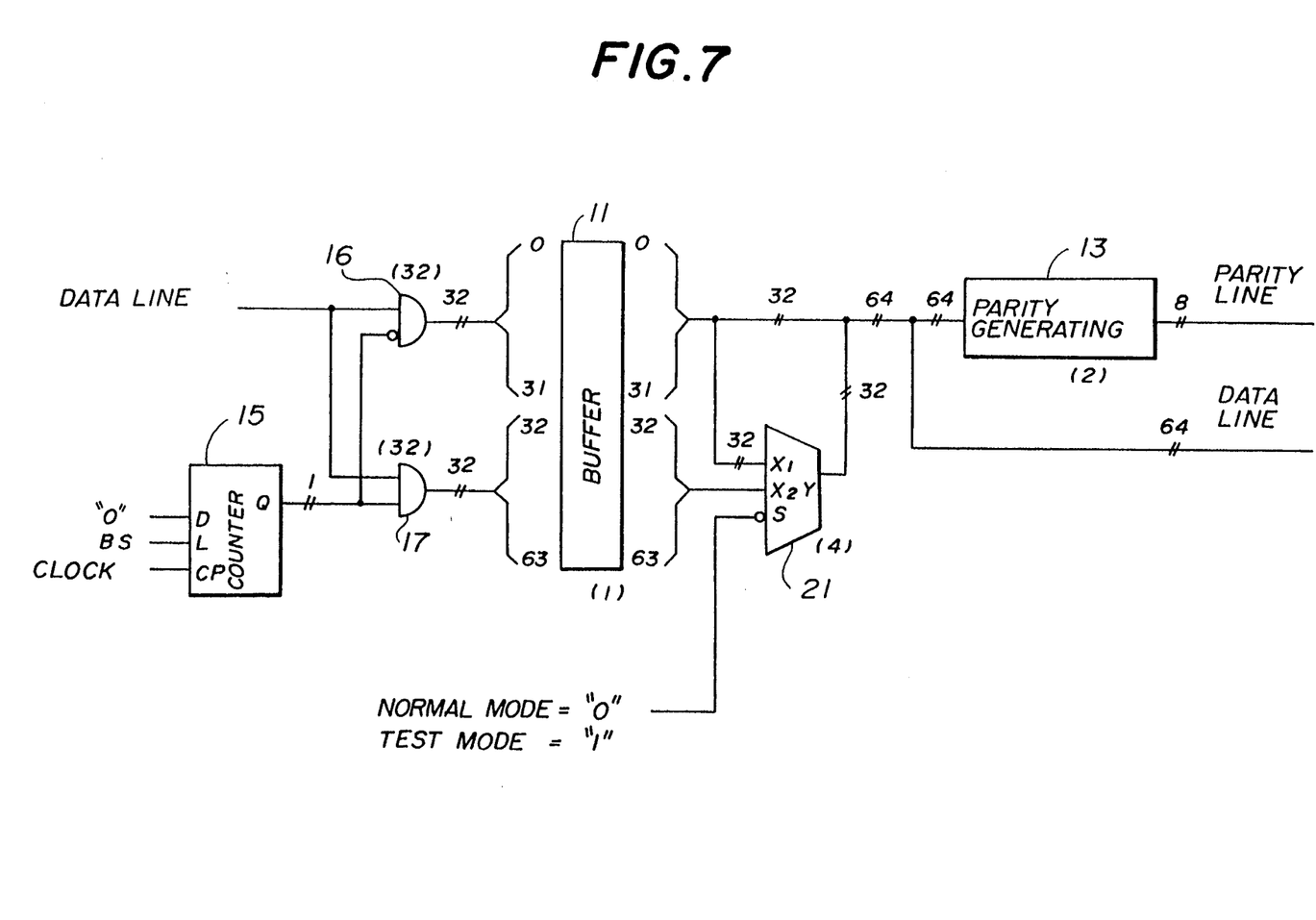
FIG. 7 is a system block diagram showing a first embodiment of a parity inversion test system according to the present invention.

Next, a description will be given of a first embodiment of a parity inversion test system according to the present invention, by referring to FIG. 7. In FIG. 7, those parts which are the same as those corresponding parts in FIG. 3 are designated by the same reference numerals, and a description thereof will be omitted. In this embodiment, a selector 21 is provided to selectively output the data corresponding to the upper half of the 64 bits output from the buffer 11 and the data corresponding to the lower half of the 64 bits output from the buffer 11.

In FIG. 7, the AND gates 16 and 17 alternately open in response to the signals "0" and "1" output from the counter 15, as described above. Hence, the data from the 32-bit data line is alternately input to the upper bits 0 to 31 and the lower bits 32 to 63 of the buffer 11.

A signal input to a terminal S of the selector 21 is "0" in a normal mode and is "1" in a test mode. Thus, in the test mode in which the parity inversion test is carried out, the selector 21 selectively outputs the data received at an input terminal $X_1$. In other words, the data corresponding to the upper bits 0 to 31 of the 64-bit output data of the buffer 11 and the data corresponding to the upper bits 0 to 31 which are selected via the selector 21 are output in parallel to the 64-bit data line as a 64-bit data. With respect to this 64-bit data, the parity generating circuit 13 inverts 1 bit of the data which is specified for every 8 bits to generate the parity data, and the 8-bits parity data is output to the parity line.

On the other hand, in the normal mode in which no parity inversion test is carried out, the selector 21 selectively outputs the data received at an input terminal $X_2$. Hence, the data corresponding to the upper bits 0 to 31 and the data corresponding to the lower bits 32 to 63 of the 64-bit output data of the buffer 11 are output in parallel to the 64-bit data line as a 64-bit data. With respect to this 64-bit data, the parity generating circuit 13 generates 1 bit of the parity data for every 8 bits of the 64-bit data to generate the parity data, and the 8-bits parity data is output to the parity line.

In this embodiment, the method of inputting the data to the buffer 11 is the same as that of the conventional system shown in FIG. 3, but differs from the conventional system in that the selector 21 is provided at the output side of the buffer 11. In the test mode, the selector 21 operates so that a value which is identical to the value of the upper 32 bits output from the buffer 11 is output as the lower 32 bits of the 64-bit data which is output to the 64-bit data line. Accordingly, by inputting only 1 word at the input side of the buffer 11, it is possible to obtain the output data amounting to the total number of bits of the buffer 11 having the data width of 64 bits. For this reason, unlike the conventional system shown in FIG. 3, it is possible to carry out the parity inversion test with respect to all bits of the 64-bit data line without the need to input 2 words of data to the upper 32 bits and the lower 32 bits of the buffer 11. Consequently, the test time can be reduced and the parity inversion test can be simplified.

The bits whose codes are to be inverted in the parity generating circuit 13 for the purpose of the parity inversion test can be specified by inputting an external signal to a terminal of a large scale integrated circuit (LSI) which accommodates the circuit shown in FIG. 7 and the like. In this embodiment, the external signal applied to this terminal specifies the bit whose code is to be inverted out of the 8-bits data which is input to the parity generating circuit 13.

Alternatively, an internal register may be provided within the LSI. In this case, the bit whose code is to be inverted out of the 8-bits data which is input to the parity generating circuit 13 is specified by setting a predetermined value in this internal register prior to carrying out the parity inversion test.

Figure 8:
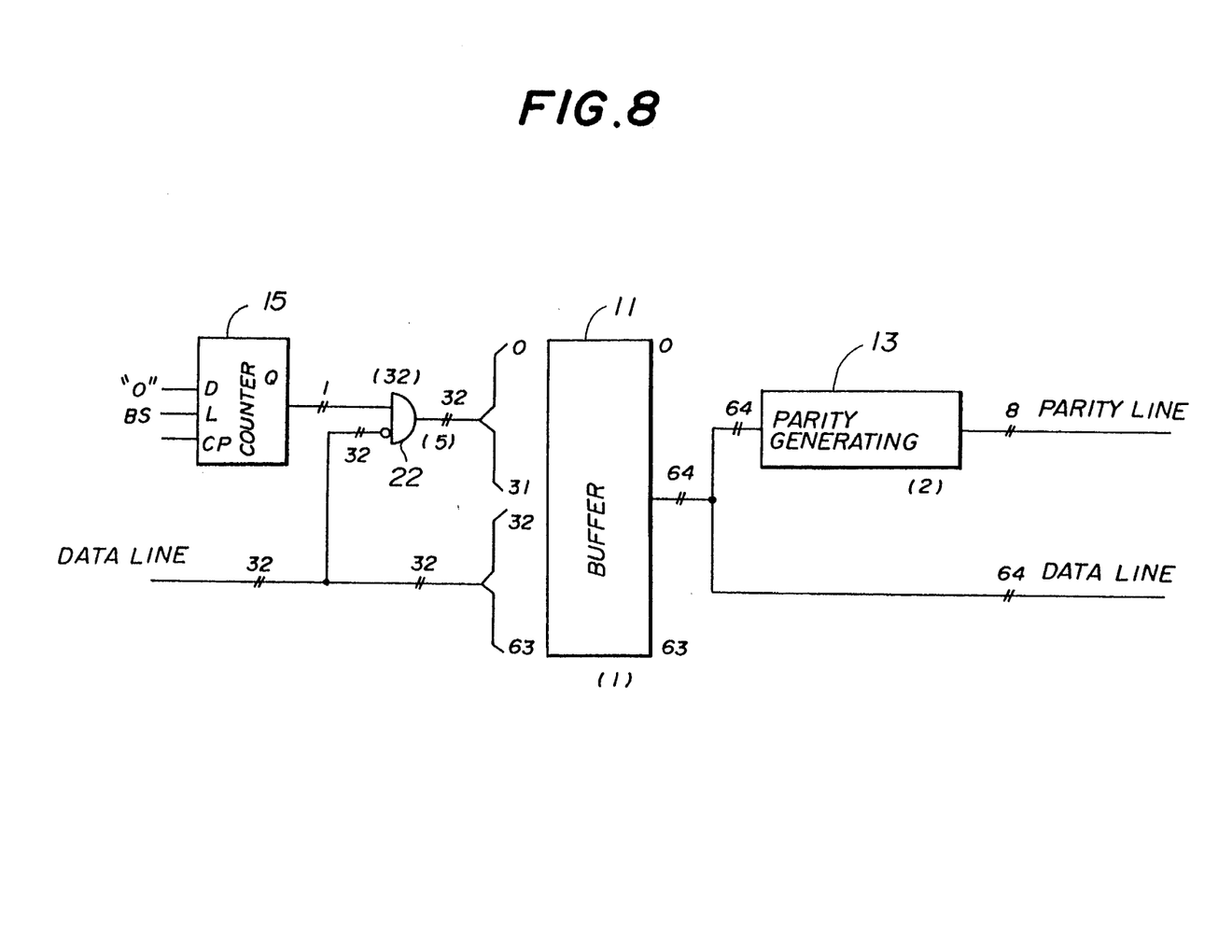
FIG. 8 is a system block diagram showing a second embodiment of the parity inversion test system according to the present invention.

Next, a description will be given of a second embodiment of the parity inversion test system according to the present invention, by referring to FIG. 8. In FIG. 8, those parts which are the same as those corresponding parts in FIGS. 3 and 7 are designated by the same reference numerals, and a description thereof will be omitted. In this embodiment, an AND gate 22 is provided to selectively supply the data from the 32-bit data line to the buffer 11 depending on the output of the counter 15.

In FIG. 8, the data from the 32-bit data line is input to the lower bits 32 to 63 of the buffer 11. On the other hand, the signal which alternately becomes "0" and "1" is input to the AND gate 22 from the counter 15, and the data from the 32-bit data line is input to the upper bits 0 to 31 of the buffer 11 when the signal "0" is received from the counter 15. In this case, a 64-bit data is input to the buffer 11.

The buffer 11 outputs this 64-bit data to the 64-bit data line. With respect to this 64-bit data, the parity generating circuit 13 inverts 1 bit of the data which is specified for every 8 bits to generate the parity data, and the 8-bits parity data is output to the parity line.

Therefore, according to this embodiment, the same data is prepared and stored in the buffer 11 for the upper 32 bits and the lower 32 bits of the 64-bit data which is to be input to the buffer 11 prior to inputting the 64-bit data to the buffer 11. For this reason, it is possible to obtain the input data amounting to the total number of bits of the buffer 11 having the data width of 64 bits. For this reason, unlike the conventional system shown in FIG. 3, it is possible to carry out the parity inversion test with respect to all bits of the 64-bit data line without the need to input 2 words of data to the upper 32 bits and the lower 32 bits of the buffer 11. Consequently, the test time can be reduced and the parity inversion test can be simplified.

The bits whose codes are to be inverted in the parity generating circuit 13 for the purpose of the parity inversion test can be specified by inputting an external signal to a terminal of the LSI which accommodates the circuit shown in FIG. 8 and the like. In this embodiment, the external signal applied to this terminal specifies the bit whose code is to be inverted out of the 8-bits data which is input to the parity generating circuit 13.

Alternatively, an internal register may be provided within the LSI. In this case, the bit whose code is to be inverted out of the 8-bits data which is input to the parity generating circuit 13 is specified by setting a predetermined value in this internal register prior to carrying out the parity inversion test.

In the described embodiments, the interface circuit connects the 32-bit data line and the 64-bit data line, and the data width at the output side in its entirety are coupled to the output of the buffer and the data width at the input side in its entirety are coupled to the input of the buffer. However, the present invention is not limited to such a case. In other words, if the data width at the input side is smaller than the data width at the output side, it is possible to couple only a part of the data width at the output side to the output of the buffer or to couple only a part of the data width at the input side to the input of the buffer when carrying out the parity inversion test for the entire data width of the interface circuit.

Next, a description will be given of a data processing system which is applied with the parity inversion test system according to the present invention, so as to explain the effects of the present invention.

Figure 9:
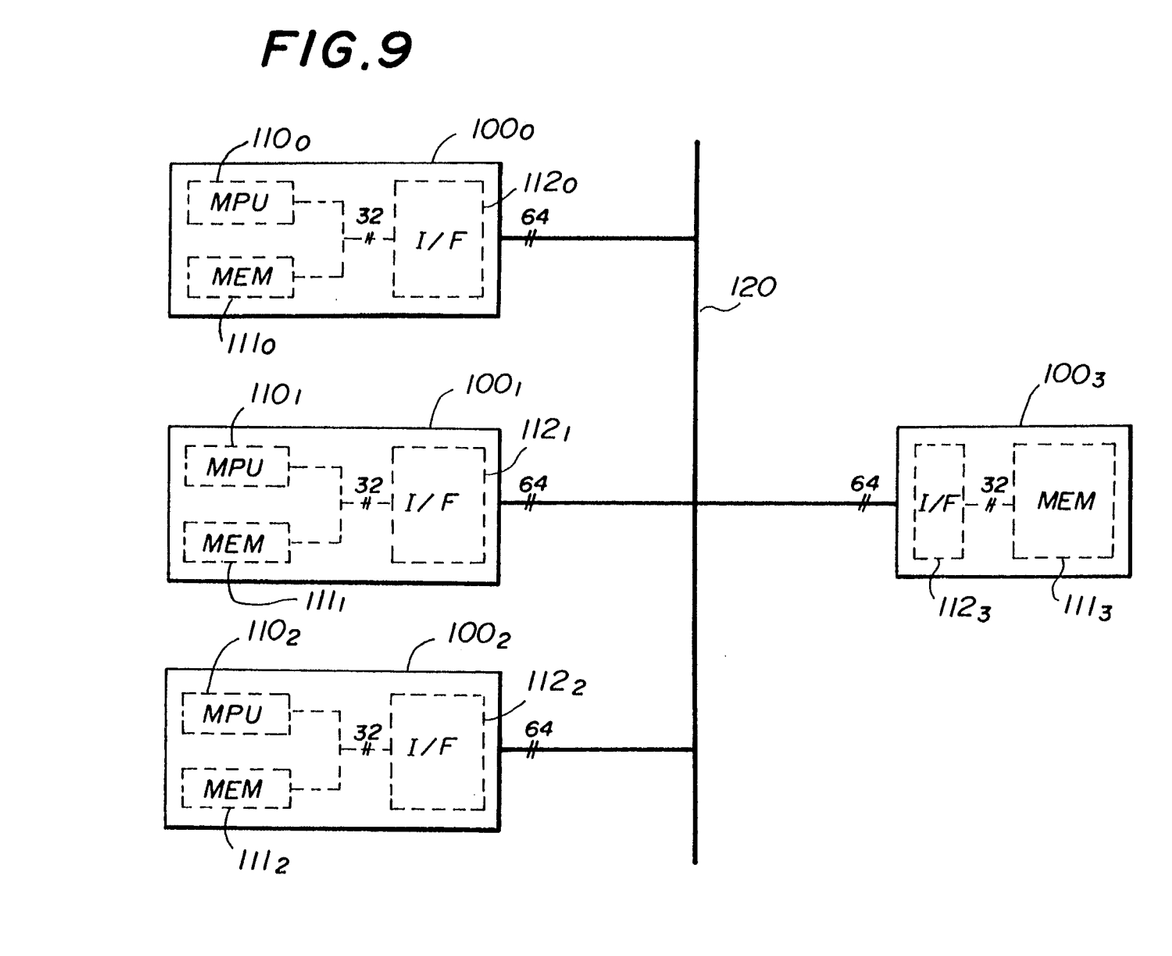
FIG. 9 is a system block diagram showing a data processing system for explaining an application of the present invention.

FIG. 9 shows a data processing system made up of processing units $100_0$ through $100_3$ which are coupled via a 64-bit bus 120. The processing units $100_0$ through $100_2$ have the same construction. Each processing unit $100_i$ includes a microprocessor unit (MPU) $110_i$, a memory $111_i$ and a bus interface circuit $112_i$, where i=0, 1 and 2. The bus interface circuit $112_i$ corresponds to the interface circuit 1 shown in FIG. 6. On the other hand, the processing unit $100_3$ includes a bus interface circuit $112_3$ and a main memory $111_3$.

For example, the MPU $110_0$ within the processing unit $100_0$ supports a block (multiple word) access in which an access is made to a plurality of words making up the block. But the MPU $110_2$ within the processing unit $100_2$ only supports a 1 (single word) word access.

Figure 10:
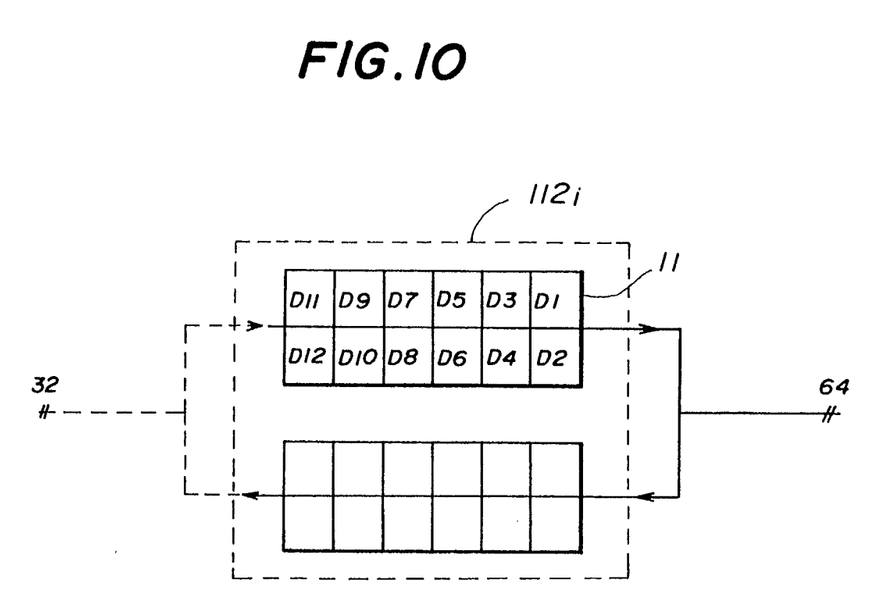
FIG. 10 a diagram for explaining the storage of data within a bus interface circuit shown in FIG. 9.

When carrying out the parity inversion test in the case where the MPU $110_0$ of the processing unit $100_0$ makes a parity inversion test during the block access in which the data amounting to 4 words (that is, an even number of words) are written to the memory $111_3$ of the processing unit $100_3$, words D1 through D4 of the data are written into the buffer 11 of the bus interface circuit $112_0$ as indicated by D1 through D4 in FIG. 10. The following words D5 through D12 are written into the buffer 11 in a similar manner as indicated by D5 through D12. Hence, the data transfer to the processing unit $100_3$ in this case is made using all 64 bits of the 64-bit bus 120. In other words, the words D1 and D2 are respectively transferred in the upper 32 bits and the lower 32 bits during the first transfer, and the words D3 and D4 are respectively transferred in the upper 32 bits and the lower 32 bits during the next transfer. Therefore, it is possible to operate on all of the parity bits and carry out the parity inversion test for all of the data bits.

On the other hand, when carrying out the parity inversion test in the case where the MPU $110_2$ of the processing unit $100_2$ makes a parity inversion test during a 1 word access in which the data amounting to 1 word (that is, an odd number of words) is written to the memory $111_3$ of the processing unit $100_3$, each word of the data is only written into the upper 32 bits of the buffer 11 of the bus interface circuit $112_2$ in the case of the first embodiment. However, the same word is output in the lower 32 bits at the output side of the buffer 11 as described above in conjunction with FIG. 7. Furthermore, in the case of the second embodiment, the same word is input to and written into the upper and lower 32 bits of the buffer 11 as described above in conjunction with FIG. 8. Therefore, in either case, it is possible to operate on all of the parity bits and carry out the parity inversion test for all of the data bits, unlike the conventional system described in conjunction with FIGS. 1 through 5 in which the word output from the lower 32 bits at the output of the buffer 11 is undetermined thereby making it impossible to carry out the parity inversion test in a satisfactory manner.

Further, the present invention is not limited to these embodiments, but various variations and modifications may be made without departing from the scope of the present invention.

What is claimed is:

1. A parity inversion test system comprising:
   interface means having an input side coupled to a N-bit data line and an output side coupled to a M-bit data line, where N<M;
   output coupling means, coupled to the output side of said interface means, said output coupling means receiving a signal indicative of a normal mode and a signal indicative of a test mode and receiving a data output from said output side of said interface means and coupling at least a part of said data output from the output side of said interface means to the data output from the output side of said interface means in response to said signal indicative of a test mode so as to output a M-bit data;
   parity generating means, coupled to the M-bit data line, for generating a parity data with respect to the M-bit data output to the M-bit data line via said output coupling means based on the M-bit data; and
   parity inversion bit specifying means, coupled to said parity generating means, for specifying arbitrary bits of the M-bit data output to said M-bit data line which are to be inverted when generating the parity data in said parity generating means.

2. The parity inversion test system as claimed in claim 1, wherein M=nN, where n is an integer greater than or equal to two.

3. The parity inversion test system as claimed in claim 2, wherein n=2.

4. The parity inversion test system as claimed in claim 3, wherein said interface means includes a M-bit buffer for storing N bits of data received from the N-bit data line in upper N bits out of the M bits when a N-bit word access is supported, and said output coupling means includes a selector supplied with upper N bits and lower N bits output from the M-bit buffer and for selectively outputting the upper N bits output from the M-bit buffer in parallel with the upper N bits to form the M-bit data in response to said signal indicative of the test mode.

5. The parity inversion test system as claimed in claim 1, wherein said parity inversion bit specifying means includes terminal means for specifying the arbitrary bits of the M-bit data to be inverted in response to an external signal.

6. The parity inversion test system as claimed in claim 1, wherein said parity inversion bit specifying means includes register means for specifying the arbitrary bits of the M-bit data to be inverted in response to a value set therein.

7. A parity inversion test system comprising:
   interface means having an input side coupled to a N-bit data line and an output side coupled to a M-bit data line, where $N<M$;
   input coupling means, coupled to the N-bit data line and to the input side of said interface means, said input coupling means receiving a signal indicative of a normal mode and a signal indicative of a test mode and providing a data input to the input side of said interface means and coupling at least a part of said data input to the input side of said interface means to the data input to said interface means in response to said signal indicative of a test mode so as to input a M-bit data to said interface means;
   parity generating means, coupled to the M-bit data line, for generating a parity data with respect to the M-bit data output to the M-bit data line from said interface means based on the M-bit data output from said interface means; and
   parity inversion bit specifying means, coupled to said parity generating means, for specifying arbitrary bits of the M-bit data output to said M-bit data line which are to be inverted when generating the parity data in said parity generating means.

8. The parity inversion test system as claimed in claim 7, wherein $M=nN$, where n is an integer greater than or equal to two.

9. The parity inversion test system as claimed in claim 8, wherein $n=2$.

10. The parity inversion test system as claimed in claim 9, wherein said interface means includes a M-bit buffer for storing N bits of data received from the N-bit data line in lower N bits out of the M bits and the N-bit data output from said input coupling means in upper N bits, and said input coupling means includes a gate supplied with the N bits of data received from the N-bit data line and for selectively supplying the N bits of data to the upper N bits of the M-bit buffer in response to said signal indicative of the test mode.

11. The parity inversion test system as claimed in claim 7, wherein said parity inversion bit specifying means includes terminal means for specifying the arbitrary bits of the M-bit data to be inverted in response to an external signal.

12. The parity inversion test system as claimed in claim 7, wherein said parity inversion bit specifying means includes register means for specifying the arbitrary bits of the M-bit data to be inverted in response to a value set therein.

* * * * *